United States Patent
Gibson et al.

(10) Patent No.: US 10,944,845 B1
(45) Date of Patent: Mar. 9, 2021

(54) SYSTEM, METHOD, AND COMPUTER READABLE STORAGE MEDIUM FOR CONSOLIDATED CONTENT AGGREGATION, ANALYTICS, NOTIFICATION, DELIVERY, AND TRACKING

(71) Applicant: JamFeed, Inc., Austin, TX (US)

(72) Inventors: Cameron Gregory Gibson, Austin, TX (US); Tyler Gibson, San Marcos, TX (US)

(73) Assignee: JamFeed, Inc., Austin, TX (US)

( * ) Notice: Subject to any disclaimer, the term of this patent is extended or adjusted under 35 U.S.C. 154(b) by 665 days.

(21) Appl. No.: 14/630,432

(22) Filed: Feb. 24, 2015

Related U.S. Application Data

(60) Provisional application No. 61/944,179, filed on Feb. 25, 2014.

(51) Int. Cl.
*H04L 29/08* (2006.01)
*G06Q 30/06* (2012.01)

(52) U.S. Cl.
CPC ......... *H04L 67/32* (2013.01); *G06Q 30/0631* (2013.01)

(58) Field of Classification Search
CPC ..................................................... G06Q 30/06
USPC ............................................... 705/26.1–27.2
See application file for complete search history.

(56) References Cited

U.S. PATENT DOCUMENTS

| | | | |
|---|---|---|---|
| 7,035,871 B2 * | 4/2006 | Hunt | G06F 16/9535 707/802 |
| 2009/0164516 A1 * | 6/2009 | Svendsen | G11B 27/105 |
| 2009/0277322 A1 * | 11/2009 | Cai | G10H 1/0058 84/609 |
| 2011/0288924 A1 * | 11/2011 | Thomas | G06Q 30/02 705/14.25 |
| 2014/0280304 A1 * | 9/2014 | Scherf | G06F 17/30743 707/769 |

(Continued)

OTHER PUBLICATIONS

Nakano, T., Yoshii, K., & Goto, M. (2016). Musical similarity and commonness estimation based on probabilistic generative models of musical elements. International Journal of Semantic Computing, 10(1), 27-52. doi:http://dx.doi.org/10.1142/S1793351X1640002X.*

*Primary Examiner* — Jeffrey A. Smith
*Assistant Examiner* — Jennifer V Lee
(74) *Attorney, Agent, or Firm* — Dickinson Wright, PLLC; Stephen A. Mason; Jonathan H. Harder

(57) ABSTRACT

A content delivery system consolidates aggregates and analyzes content. Content may be construed broadly, such as text, video, audio, merchandise, news, bands, festivals, venues, release dates, concerts, performances, etc. The system may obtain content, filter content and/or apply preferences and/or analytics to determine a particular content. Analytics may include various content matching processes, such as hashing, for example. A notification may be generated based on the particular content and the notification may be sent, to a user's portable device for example. An aggregation application on the portable device may present an indication of the notification and response to selection of the notification. For example, the aggregation application may display the content associated with the notification. The aggregation application may track the user's behavior and update various analytics based on the tracking information.

18 Claims, 10 Drawing Sheets

(56) References Cited

U.S. PATENT DOCUMENTS

2015/0032769 A1\* 1/2015 Rose .................. G06F 16/4387
707/769

\* cited by examiner

FIG. 9A add article 910

- title 912
- source 914
- article link 916
- picture link 918
- date / / 919
- push to fans no
- clear   confirm

FIG. 9B social media connections 920

- facebook link 922
- twitter link 924
- you tube link 926
- soundcloud link 928
- clear   confirm

FIG. 9C add you tube video 930

- title 932
- you tube link 934
- date / / 936
- clear   confirm

FIG. 9D add artist image 940

- imgur link 942
- clear   confirm

SYSTEM, METHOD, AND COMPUTER READABLE STORAGE MEDIUM FOR CONSOLIDATED CONTENT AGGREGATION, ANALYTICS, NOTIFICATION, DELIVERY, AND TRACKING

PRIORITY

This application claims benefit of priority of U.S. Provisional Application Ser. No. 61/944,179, filed on Feb. 25, 2014.

BACKGROUND

Technical Field

This disclosure relates generally to a content aggregation and delivery system, and more specifically to an analytics engine that analyzes and selects particular content from aggregated content.

Description of the Related Art

The information age has ushered in a time of unprecedented amounts of information. The vast amounts of information may make it difficult to sort through to find the particular information that is desired. Old media and new media compete for eyeballs, the former relying upon trust and the latter based upon convenience.

The rise of numerous various sources of information, each with some advantages and weaknesses, sometimes causes users to look to numerous various sources. Not only is going to various sources time consuming and inconvenient, but as new sources of information are developed, a customer may feel the need to change the various sources that they rely upon. Customers may be left feeling unsure that they have the latest information or that there might be some other source with better information, for example, more accurate breaking news, exclusive content, or access to additional content or merchandise or shows.

BRIEF DESCRIPTION OF THE DRAWINGS

FIGS. 9A-9D illustrate user interface elements for platform management module, according to embodiments.

Figure 1:
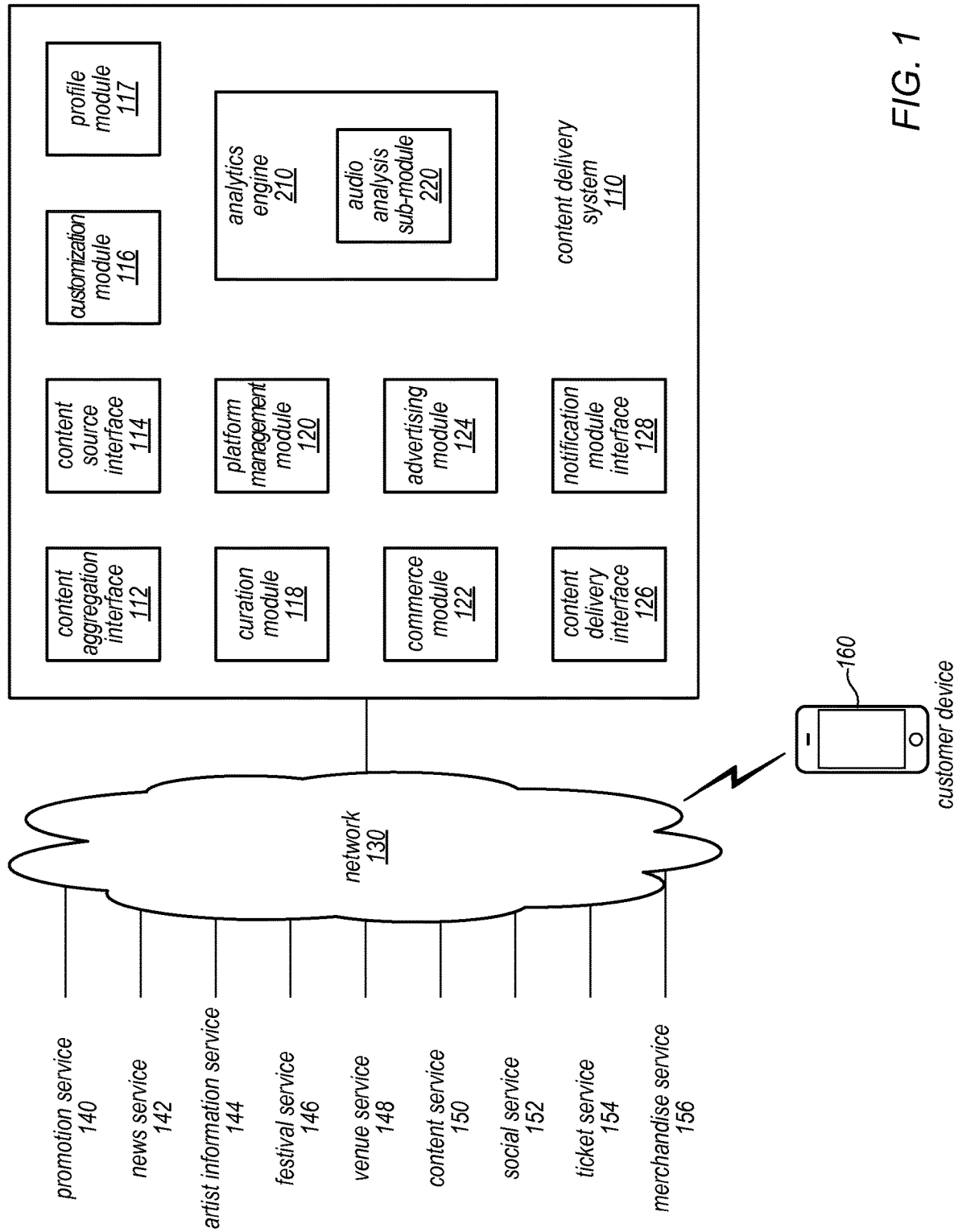
FIG. 1 illustrates a content delivery system they may interact with various external services, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of devices, systems and methods for providing a content delivery system and content delivery application (e.g., an aggregation application), components or modules of which may be configured to obtain and aggregate content, determine a particular content of the aggregated content (e.g., based on analytical processing of the content), generate and display a notification based on the particular content information, and provide the particular content upon user selection of the content, are disclosed.

The devices, systems and methods describe herein may be applicable to many different content topics. For example, in some embodiments, entertainment-based content (e.g., music-based content or sports-based content), or business-based content (e.g., corporate content) may be obtained, aggregated and delivered by systems and methods such as those disclosed herein. Although numerous examples and embodiments disclosed herein are directed to music-based embodiments, similar devices, systems and methods may be applied to other topics as well, in combination or separately. For example, a particular embodiment may be directed to business content only, while another embodiment may be directed to combined music and business content, for example. Other numerous content types are contemplated without departing from the scope of the disclosure.

In general, embodiments of the disclosure are directed to a content delivery system and a content delivery application. In embodiments, the content delivery system includes component/modules for obtaining/receiving content, aggregating the content and analyzing the content. For example, an analytics engine may analyze content received by the content delivery system and make a determination of a particular content of the aggregated content. In some embodiments, the determination may be based on various types of analytics, such as numerical analysis, or historical data (e.g., such as a user's past content interests as indicated from historical records) or based on a user preferences or a user profile, configured by the user, for example.

In embodiments, the content delivery system may generate a notification based on the determined particular content and send the notification (e.g., via push notification) to a customer's device (e.g., a portable device). A content delivery application on the device (e.g., an application matched to the content delivery system) may receive the notification and display or otherwise (e.g., audibly) indicate the notification to the customer/user, in embodiments.

The content delivery application may deliver (e.g., together with the content delivery system) the content associated with the notification upon selection of the notification. In embodiments, the content delivery application may track a user's behavior with respect to the notification and/or associated content. For example, the content application may track behavior that is perceived by the content application (e.g., whether the user opts to view/listen to the entire content, how much time is spent consuming the content, etc.). The tracked behavior may be sent to the content delivery system for storage and/or analysis. For example, the tracked behavior may be part of a feedback loop that makes content determinations more accurate or otherwise more effective.

FIG. 1 illustrates a content delivery system they may interact with various external services, according to some embodiments. Various components (e.g., modules, components, services) of the system illustrated in FIG. 1 may perform various parts of the processes, illustrated in FIGS. 2, 4, and 6. In embodiments, the devices and services illustrated in FIGS. 1, 3, 5, 8 and 10 may perform all or some of the illustrated processes. The content delivery system 110 may receive and aggregate content from services 140-156, process the content and provide notifications and/or particular portions of the content to an aggregation application on customer device 160, in embodiments.

Unless specified otherwise, content is to be construed broadly. For example, within a music-oriented system content may include music news, band or artist information, festival information, venue information, album/song/video releases, concerts, performances, tickets, merchandise, etc. In some instances, content may include advertising for other content, such as advertising for concert tickets. In some instances the content may include the tickets, for example, the content delivery system may deliver concert tickets to the device 160 via the aggregation application. In some embodiments, the content may include advertising for merchandise or the merchandise. For example, the content may include a music file. In some embodiments the content may include an offer to purchase merchandise via the aggregation application interface such that the merchandise is delivered to the customer (e.g., via common carrier). Content may take any of various forms, such as but not limited to text, video, still images, audio, digital files, streaming content, etc.

In an embodiment, content provider services, such as services 140-156 may provide content to the content delivery system 110. Various of the services 140-156 may provide content via numerous different technologies including, but not limited to push or pull services. In some embodiments, the external services 140-156 may provide access to a data store (not illustrated) or may provide streams of information. The content delivery system 110 may receive/obtain the content via network 130, in embodiments, although different services/systems 140-156 may be accessed via or use a different network.

In embodiments, promotion service 140 may provide various types of content from various promotor services. For example, artist managers may hire various promotors to gain access to promotional channels that are tailored to the artist's work. The promotors may provide various media such as stories, advertising, or the like that is aggregated by the content delivery system 110. News service 142 may provide various news stories, breaking news or continuous news updates, for example. Artist information services 144 may provide various types of information about artists, for example, artist biographies, lyrics, album artwork, etc. Festival service 146 may provide information about festivals. In some embodiments, festival service 146 may provide information for a website or application that a particular festival relies on to disseminate information about the festival. Venue service 148 may provide information about various venues, for example, seating, concert dates, venue location and/or ticket sales, etc. Content service 150 may provide various types of content, content downloads, streaming content or subscriptions services for example. Social service 152 may provide information for any of various social networking sites. For example, customer profile information may be obtained from a social networking site, or a customer's list of friends may be obtained from the social networking site. Ticket service 154 may provide information about tickets, in embodiments. In one example, the aggregation application may provide access to purchase tickets via the ticket service 154 via the aggregation application user interface. Merchandise service 156 may provide content associated with various merchandise that is associated with the content that is aggregated and displayed to customers.

In embodiments, content delivery system 110 is illustrated with multiple component/modules/interfaces 112-128 and 210, 220. In some embodiments, the content delivery system may include more or fewer components/modules/interfaces or may share components/modules/interfaces with the aggregation application that displays the notifications/content.

In embodiments, content source interface 114 provides an interface between the external services 140-156 and the content delivery system 110. Content aggregation interface 112 may support both obtaining/receiving information/content from the external service 140-156 as well as sending information to the external services 140-156. In some embodiments, at least some of the services provide content that is stored by the content delivery system 110. Content aggregation interface 112 may act as an interface between the data store and the component/modules/interfaces of the content delivery system 110 that access the content stored by the content delivery system 110.

In embodiments, customization module 116 provides functionality for user-specified customization of filters that are applied to the aggregated content. This, in effect, creates a personalized aggregation application for each individual user. Based on setting that may be specified via the user interface, a user may configure the aggregation application to receive push notifications for breaking news updates on only their selected favorites. Profile module 117 may include functionality for obtaining (e.g., via social networking site, or via data entry interface) a user profile and for editing the user profile.

In some embodiments, curation module 118 may provide user interface elements linked to functionality for curating content. For example, content may be customer tailored (e.g., by promotion service 140 or by curators who curate for the content delivery system) to promote a particular artist, venue, festival, etc. In some embodiments, access to the curation module may be limited to those with curation rights (e.g., the artist, the artist's promotor, or curation agents). Platform management module 120 may provide various interface elements and functionality associated with content for a particular artist (examples of which are illustrated in FIGS. 9A-9D). Access to the platform management module may be limited (e.g., to an artist or agents of the artist), in embodiments. The platform management module 120 may be used to manage content for an artist, in embodiments.

Commerce module 122 may include interface elements and functionality for conducting transactions via the aggregation application, in embodiments. For example, a ticket service that is presented via the aggregation application portal may rely upon commerce module 122 for supplying transaction functionality for purchase of tickets. In another example, the commerce module 122 may provide transaction functionality for purchase of merchandise from the merchandise service 156 via the aggregation application.

The advertising module 124 may include interface elements and functionality for providing advertisements as content, in embodiments. For example, the advertising module may interface with various advertising analytics systems, (e.g., AdWords) so as to provide various ads for display on device 160 via the aggregation application.

Content delivery interface 126 may act as an interface between the aggregation application on device 160 and the content delivery system. In some embodiments, the content delivery interface provides content to the customer device in response to selection of a notification. Notification module 128 may generate notifications based on content determined by the analytics engine 210. The notification module 128 may send the notifications to device 160, in embodiments.

Analytics engine 210 may determine particular ones of the content from the aggregated content, in embodiments. For example, analytics engine may perform the process illustrated in FIG. 4. Selection of a particular content may be based upon numerical analysis of content, past customer behavior, customer profile information, customer favorites or the like. In the illustrated embodiment, analytics engine 210 includes an audio analysis sub-module 220. The audio analysis sub-module may analyze audio content to determine a particular content, by determining similarities between audio files, for example.

Figure 2:
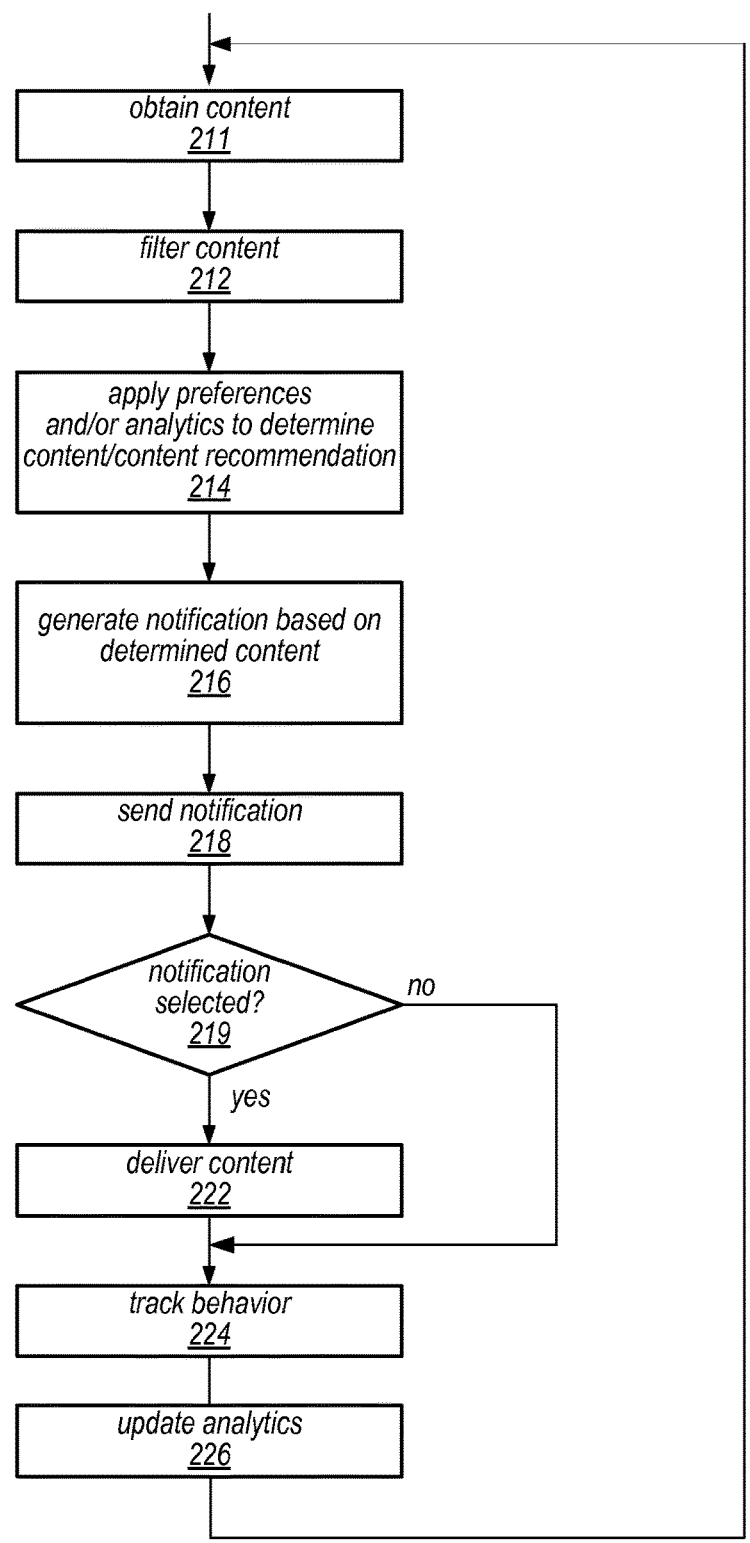
FIG. 2 is a flow chart that illustrates a process for executing content delivery, according to some embodiments.

FIG. 2 is a flow chart that illustrates a process for executing content delivery, according to some embodiments. The illustrated process may be performed by one or more of the modules/components/interfaces of the content delivery system 110, in embodiments.

In the illustrated embodiment, content is obtained (block 211). For example, the content delivery system 110 may obtain content (e.g., via content source interface 114) from a data store that the content delivery system has stored the content to, or may obtain the content from an external content service (e.g., services 140-156).

Content may be filtered (block 212). For example, content aggregation interface 112 may apply one or more filters to the content such that a subset of the aggregated content is determined. The filters may be user-specified (e.g., based on a user's favorite artists) or may be determined by analytics engine 210 (e.g., based on analysis of a user's behavior).

Preferences and or analytics may be applied to determine a particular content (block 214). For example, the analytics engine 210 may apply user-specified preferences to the filtered content or may analyze the filtered content for similarities with content selected by the user. In some embodiments, the content may be determined based on the process illustrated in FIG. 4.

A notification may be generated based on the determined content. For example, notification module interface 128 may generate a notification based on the content determined by analytics engine 210. The notification may be sent (block 218). For example, the notification module interface 128 may sent the notification to device 160. A determination of whether the notification was selected may be made. For example, the notification module may receive an indication from the device 160 that the notification was or was not selected by the user via the user interface of the device 160. If the notification was selected, the content may be delivered (block 222) and the user's behavior tracked (block 224). Analytics associated with the user and/or content may be updated in either case (block 226). For example the analytics engine 210 may update expected user behavior associated with this particular content or for this particular individual user.

Figure 3:
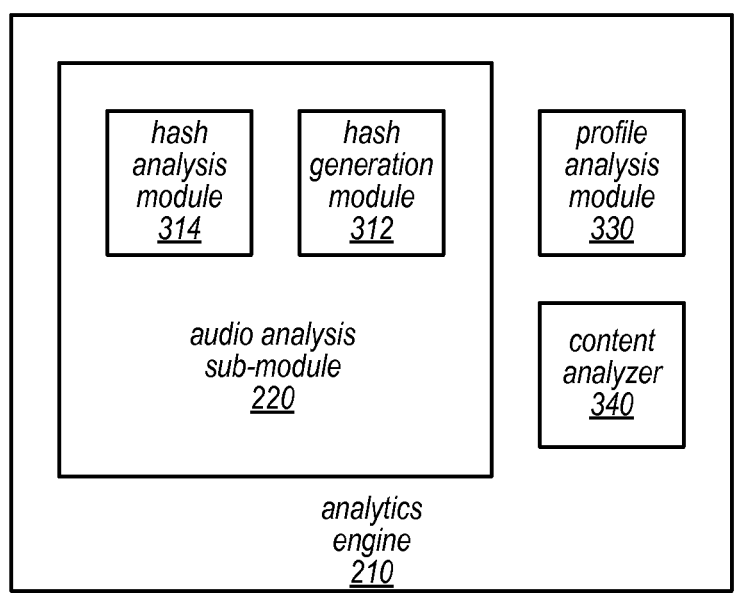
FIG. 3 is a block diagram of an analysis engine, according to some embodiments.

FIG. 3 is a block diagram of an analytics engine 210, according to some embodiments. The process illustrated in FIG. 4 may be performed by the analytics engine 210, in embodiments. Analytics engine 210 is illustrated with audio analysis sub-module 220, profile analysis module 330 and content analyzer 340.

The profile analysis module 330 may analyze a user's/customer's profile as part of the content determination. For example, a user's profile may include information about the customer/user such as geographic location, age, sex, etc. and the profile analysis module may analyze these characteristics of the user to determine a preference for classical music or county music, for example. In another example, the profile analysis module 330 may access a users' list of friends or contacts in the user profile and look for a common trait among the friends or contacts that might be applied to the user. The preferences and/or traits determined by the profile analysis module may be used by the analytics engine to select particular content for the user.

Content analyzer 340 may analyze content that the user has consumed in the past to determine a content. For example, if records associated with the customer indicate that the customer has watched a number of videos from a particular artist, the content analyzer may find other content from the same artist and provide the other content to the analytics engine 210 to base a determination one.

Analytics engine 210 may use any of numerous methods to determine a particular content from the aggregated content. For example, in at least the illustrated embodiment, analysis based on a similarity between hash values of content may be used to determine a particular content. Audio analysis sub-module 220 is illustrated with hash analysis module 314 and hash generation module 312. Hash generation module 312 obtains audio content and generates a hash value based on the content, in embodiments. The hash analysis module 314 compares the hash values of the aggregated content to determine has values that are similar, in some embodiments. The analytics engine 210 may determine a particular content from the aggregated content based on the level of similarity, for example. In some embodiments, a similarity threshold may be used to determine a particular content. In some embodiments the most similar content may be selected. In some embodiments, information from the profile analysis module 330, content analyzer 340 and audio analysis sub-module 220 may be used singly or together with one another to determine a particular content.

Figure 4:
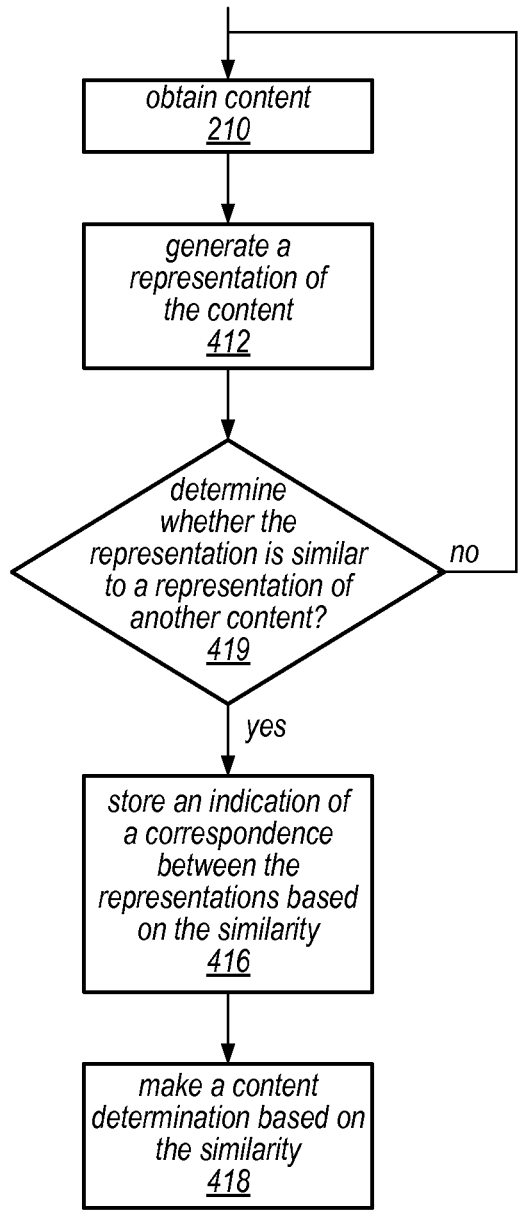
FIG. 4 is a flow diagram of a process for determining content, according to some embodiments.

FIG. 4 is a flow diagram of a process for determining content, according to some embodiments. The process may be performed by the analytics engine 210, in embodiments. Content is obtained (block 211) and a representation of the content is generated (block 412). For example, the hash generation module 312 may obtain content from a data store or an external service (e.g., services 140-156) and generate a hash value as a representation of the content.

A determination may be made whether the representation is similar to a representation of another content (block 419). For example, the hash analysis module 314 may compare respective hash values of two different contents and determine whether the two representations are similar. In some embodiments, a bit error rate (BER) may be used to compare the representations. If the representation are not similar (e.g., a BER threshold is not met or other representations are closer) the process may return to obtain more content. If the representations are similar (e.g., a BER threshold is met or other representations are not closer) an indication of a correspondence between the representations based on the similarity may be stored. (block 416). For example, the analytics engine 210 may store an indication of the similarity in a data store. A content determination may be made based on the similarity (block 418). For example, the analytics engine 210 may determine the content with the similar representation for a notification. In some embodiments, other criteria may be used as part of the determination, such as profile information or historical content consumption, or content consumption by friends of a social network.

Figure 5:
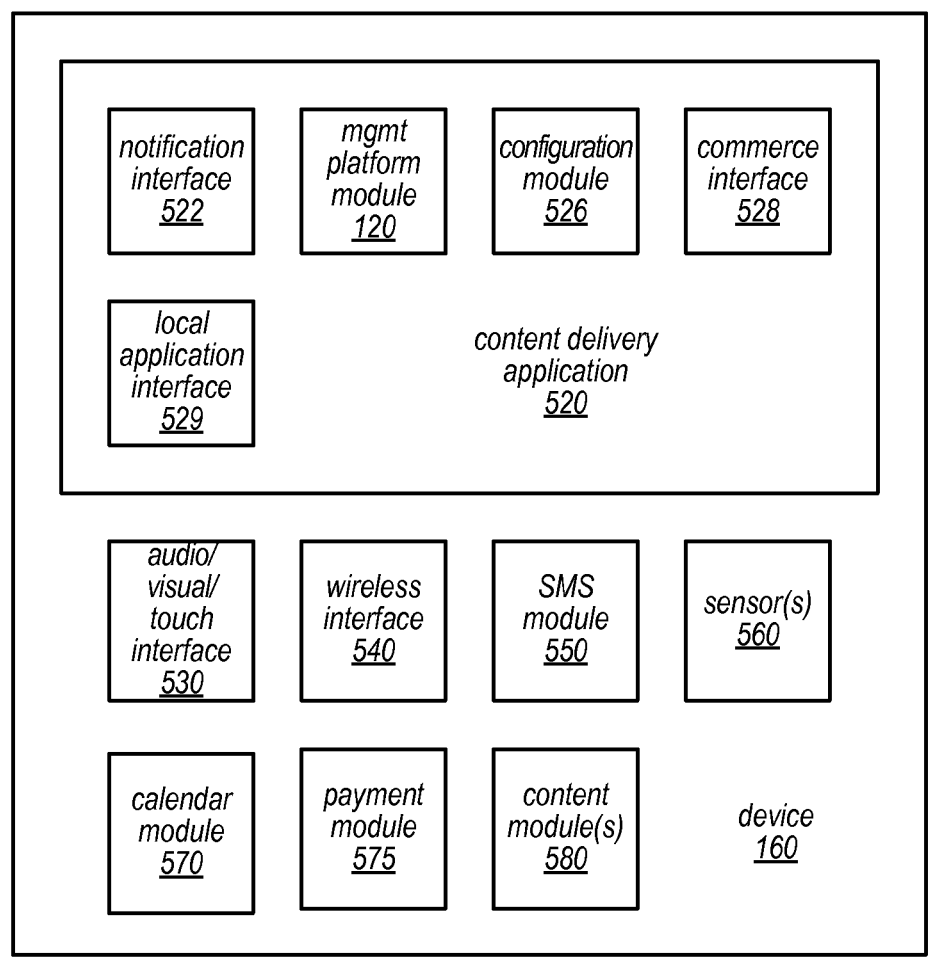
FIG. 5 is a block diagram of a device that may execute a content delivery application, according to some embodiments.

FIG. 5 is a block diagram of a device that may execute a content delivery application 520, according to some embodiments. The content delivery application 520 may perform some of all of the process illustrated in FIG. 6, in embodiments. The modules and interfaces illustrated in device 160 may communicate with one another to perform various processes (such as the process in FIG. 6).

Device 160 is illustrated with audio/visual/touch interface 530 that, in embodiments provides a user interface for two-way communication. For example, the interface may display interface elements (e.g., user-selectable interface elements), receive touch-based input and/or provide a haptic sensation. In another example, the device may have an audio output and audio input for playing sounds or receiving audible input.

A wireless interface 540 is illustrated. The wireless interface may facilitate communication via a network (e.g., network 130). SMS module 550 may be configured to send and/or receive short message service-based messages. For example, SMS module 550 may be configured to receive SMS messages from notification module 128 of the content delivery system illustrated in FIG. 1.

Sensor(s) 560 may be included with device 160. For example, an audio sensor (e.g., microphone) or an image sensor (e.g., camera).

Device 160 is illustrated with a calendar module 570. The calendar module may be configured with various calendar functions such as reminders, schedules or the like. In some embodiments, the content delivery application may interact with various other applications on the device such as the calendar module 570 to obtain additional information about the user such that more accurate content determinations and recommendations can be made. For example, the content delivery application 520 may recognize a calendar entry for a concert date and provide an indication of the calendar entry to the content delivery system 110. The analytics engine 210 may include the information from the indicated calendar entry in a determination of a particular content to recommend. For example, the analytics engine 210 may determine merchandise associated with the concert's artist to recommend to the user via a notification. Device 160 is illustrated with other content module(s) 580 which represents other applications that may operate on a mobile device and may be accessed (e.g., via local application interface 529) by the content delivery application 520 to obtain additional information (e.g., for use in selection of content).

The device may be configured with payment module 575. Payment module 575 may include functionality for making and/or receiving mobile payments via the device 160, in embodiments. In embodiments, the payment module 575 may include a digital wallet.

The device 160 in FIG. 5 is illustrated with content delivery application 520. In embodiments, content delivery application (a particular embodiment of an aggregation application) may be configured to operate with content delivery system 110 to obtain information and deliver content. Content delivery application 160 is illustrated with notification interface 522, which for example, may receive notifications from notification module 128 of content delivery system 110. In embodiments, notification interface 522 may instruct display of notifications on a display of device 160 and may track whether the notification is selected. In some embodiments, the notification interface may track the user's behavior based on the user's interaction with the device 160.

In embodiments, the configuration module 526 may provide user interface elements and functionality that allows the user to configure the content delivery application. For example, the configuration module 526 may provide an interface for configuring the display of the content delivery application 520, how often updates appear, what type of notifications are received, etc.

Content delivery application 520 is illustrated with commerce interface 528. Commerce interface 528 may interact with payment module 575 to make (or accept) payments associated with the content from the content delivery system. Local application interface 529 provides an interface for interaction between the content delivery application 520 and the various applications and/or modules of the device 160. In some embodiments, the local application interface may provide functionality that takes advantage of various external applications programming interface for incorporating external applications and/or websites into the content delivery application 520. For example, a streaming music subscription may be presented via the content delivery application 520. In some instances, the content delivery application may act as a portal for delivering content from other applications or from websites. In another example, a festival may provide a downloadable application or website associated with the festival. In embodiments, the local application interface may present the user interface for the downloadable application or website via the content delivery application user interface.

In some embodiments, the content delivery application 520 may be configured with interface elements the facilitate navigating via the content delivery application 520 among various content sources. For example, a linked interface element presented while a song or video plays from one content source may cause, when selected, the display to display interface elements from another content source, such as a ticket source. Such an interface may thus aggregate various types of content from various sources and provide navigation among the various sources such that selection and performance of multiple different tasks may be provided within the content delivery application. For example, a user listening to streaming music from a streaming service may be presented with a concert ticket or merchandise purchase offer. Selection of the offer may cause the content delivery application 520 to present interface elements that when selected, cause the tickets or the merchandise to be purchased, all within the user interface of the content delivery application. In some embodiments, the various functions may be arranged based on a content topic, such as by artist, by festival or the like.

Figure 6:
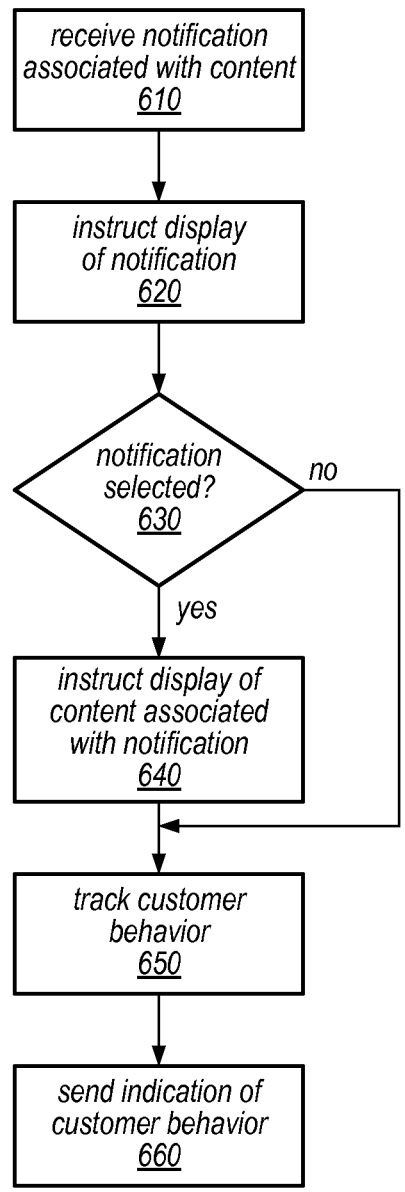
FIG. 6 is a flow diagram of a process for notifying a customer, according to embodiments.

FIG. 6 is a flow diagram of a process for notifying a customer, according to embodiments. The illustrated process may be performed by the content delivery application 520, in embodiments. A notification associated with a content is received (block 610) and display of the notification is instructed (block 620). For example, content delivery application 520 may receive an SMS notification from notification module 128 and instruct the user interface of device 160 to display an indication of the notification.

A determination of whether the notification was selected is made (block 630). If an indication of selection of the notification is received, display of the content associated with the notification may be instructed (block 640). In either case, customer behavior may be tracked (block 650) and sent to the analytics engine 210 of the content delivery system 110 (block 660)

Figure 7:
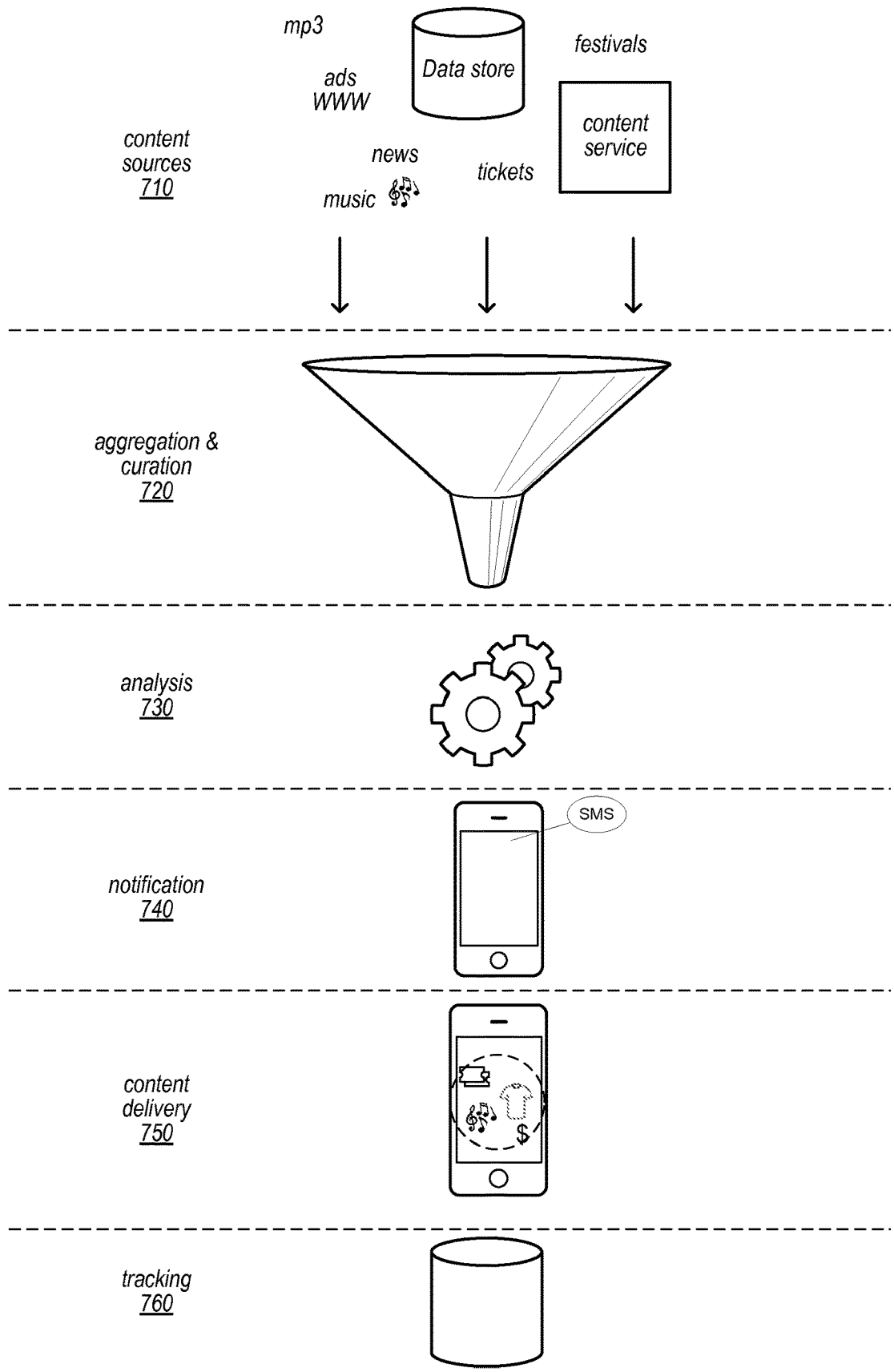
FIG. 7 is a combination block/flow diagram of a process and system for delivering content, according to different embodiments.

FIG. 7 is a combination block/flow diagram of a process and system for delivering content, according to different embodiments. FIG. 7 illustrates entities and processes for content delivery. For example various content sources 710 are illustrated that act as sources of content that is aggregated and curated 720. Analysis 730 of the aggregated content is performed and notifications 740 are generated and sent to devices. Selection of the notifications may initiate delivery of content 750. Tracking 760 may be performed during the process and information from the tracking may be used in a feedback loop to improve selection of a particular content for the user.

In some embodiments, features of one process (e.g., any of the processes illustrated in FIG. 2, 4 or 6) may be performed in real-time or near real-time with other features of the same or other process. For example, in some embodiments, the content delivery system 110 may obtain or receive content from one of the services 140-156 while the device 160 is displaying a notification or content. In some embodiments, a notification may be sent to the customer device 160 in anticipation of release of content from a service. For example, if an artist has scheduled release of a concert date or music video, a notification may be sent in advance of the actual release of the content such that the notification may be selected and the content delivered to the customer device 160 in real-time or near real-time with the actual release of the content from the system.

Figure 8C:
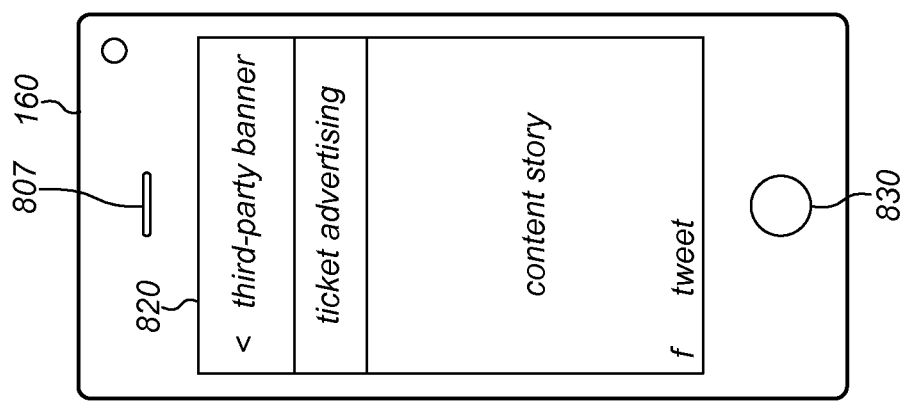
FIGS. 8A-8C illustrate a portable device for executing a content aggregation application, according to embodiments.
Figure 8B:
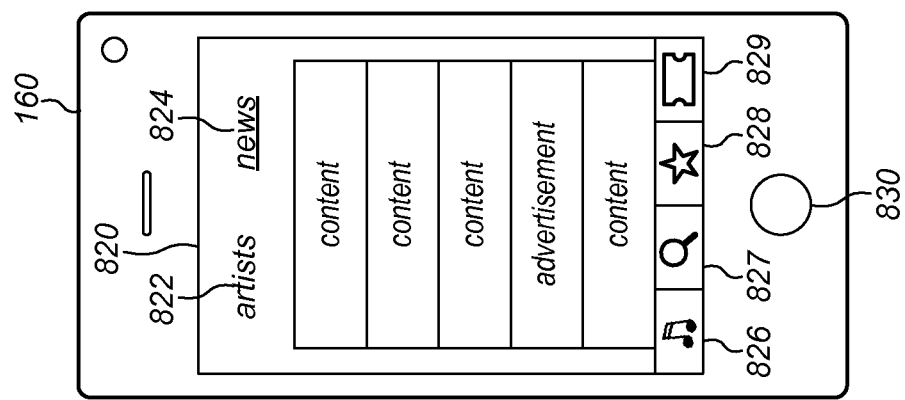
Figure 8A:
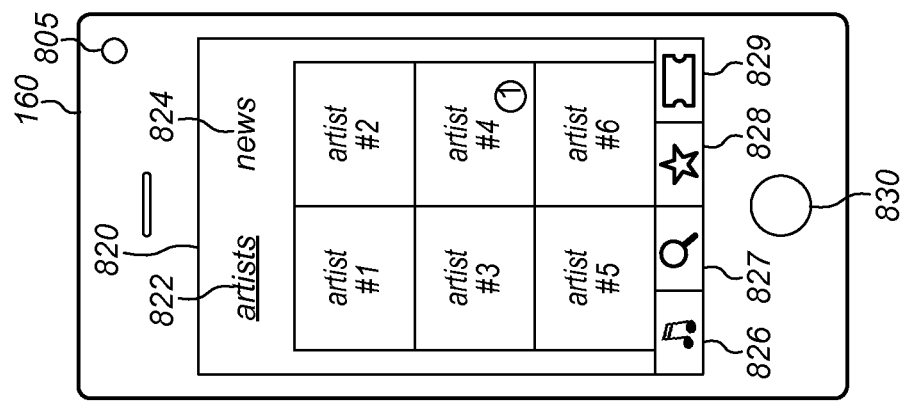

FIGS. 8A-8C illustrate examples of a user interface of a mobile music aggregation application according to various embodiments. In some embodiments, the mobile application may be a mobile music aggregation application ("mobile music aggregation app," "music application," "music aggregation application," "aggregation application," or "application" may be used interchangeably to describe the mobile music aggregation application unless otherwise noted). Illustrated is a portable device 160 with button 830, image senor 805, speaker 807 and a display/touch interface. In embodiments, button 830 may be a home, navigation or menu selection button.

The aggregation application may provide breaking news, updates, and/or top stories for musicians and bands. In some embodiments, the content may be tailored to musicians and/or bands that are indicated as favorites (e.g., favorites may be selected via a favorites user interface elements). In some embodiments, the mobile music aggregation app may use a publish/subscribe model (e.g., where a client subscribes to various channels provided by a server; whenever new content is available on one of those channels, the server pushes that information out to the client). In some embodiments, the aggregation application may also use various push technologies (e.g., instant messaging, email, HTTP server push, pushlet, long polling, flash XMLsocket relays, Apple push notification, Android push notifications, etc.) For example, push notifications on mobile devices may send alerts and updates for each user's selected artists. The notifications may be associated with or correspond to various aspects of music. For example, news on artists, tours/concerts, band information, streaming, music purchases, sharing, and social connection.

The aggregation application may be a mobile application that allows individual users to select their favorite music artists, bands, and festival events. In some embodiments, the aggregation application may allow individual users to mark (e.g., via user interface elements) an artist or band as "follow/favorite" in order to receive selected and aggregated news based upon those selected artists. In some embodiments, this allows the user to receive information on the artists they select. In some embodiments this and other user interface elements and device functionality may provide the user with the ability to discover and browse through new musical artists.

In some embodiments, the aggregation application may be available for download (e.g., from various app stores supporting iOS and/or Android platforms). When the aggregation application is initially downloaded, the user may be provided with an opportunity to click on an aggregation application icon user interface element, in embodiments. In embodiments, the user interface may respond by providing a login page. The login page may provide interface elements prompting to either "Log in with Facebook" or to "Skip for now." In embodiments, this allows the aggregation application and/or an associated server process to sync and integrate Facebook information using the Facebook API login, or to skip and have all the information stored on the device (e.g., the mobile device running the aggregation application). In embodiments, if the login is not performed via Facebook, the system may not be able to sync customer information in the aggregation application to other devices (e.g., such as a portable pad device). However, the aggregation application may still operate correctly and efficiently if this process is skipped. For example, the aggregation application may save aggregation application data to the specific device (e.g., phone) that has downloaded or executed the application.

Home Screen:

In some embodiments, once the user has been authorized and/or authenticated (e.g., logged into) or skipped the log in process, for the aggregation application, the application may present a home screen that provides user interface elements configured to facilitate use of the aggregation application. This screen may be referenced as the home screen and may include various artwork (e.g., artwork may be configured via user settings), in embodiments. Portions of, or the entirety of the aggregation application may be accessed from this home screen, in embodiments.

Home Screen/Featured News Stories:

In some embodiments, an image (e.g., the top image) may represent a "featured article" (e.g., an article that is current in the music news space) or some other content. The system may update these articles/content and/or change the content on some basis (e.g., regularly, irregularly, daily or otherwise) in embodiments. In some embodiments, the pictures represent content (e.g., such as a featured news article), and when clicked, the aggregation application may pull up the article link in a web browser view within the aggregation application For example, there may be a number of different images that are featured at any one or all times, and the aggregation application provides (e.g., via the interface elements of the user interface) the user with the ability to scroll up and down through the different featured stories of the day. Such a technical feature allows the user to stay up to date with the top stories going on within the music industry every day, in embodiments.

In some embodiments, when the user is on a page (e.g., the home page), there are dots on the image (e.g., the right hand side) that the aggregation application displays. These and other interface elements may be provided when there are multiple images/pictures. Such interface elements may be linked with a scroll feature that respond to a swipe of the user's fingers up and down across the touch screen such that the display may provide a scrolling view of some or all of the content (e.g., featured news stories).

Home Screen/Suggested Artists:

FIG. 8A illustrates how the aggregation application may display a suggested artists page, in embodiments. In some embodiments, an interface element, such as a bar associated with content (e.g., a bar with a heart on the left hand side below the featured news stories) may be displayed by the aggregation application displayed via display 820 such that an artist is suggested to the user. For example, the name in the green suggested artist bar 822 may be paired to the content (e.g., the featured story that the news is referencing). For example, artwork associated with a featured news story titled "Recently Unveiled Kurt Cobain Statue Features Tear" brings up a bar with a suggested artist with the name "Nirvana" listed since Kurt Cobain was the lead singer of Nirvana. The interface elements may use various color or shapes to signify a suggestion or recommendation. In embodiments, the suggested artist bar could be displayed as green if the user has not selected this artist as one of their favorite artists. If the artist has been selected as a favorite, the bar may appear black like all of the other favorite artists, in embodiments. Additional description on selecting favorite artists can be found below in the section titled "Favorite Artists."

In some embodiments, standard interface elements may be displayed across numerous screens. For example, FIGS. 8A, 8B and 8C illustrate an aggregation application icon 826, a search icon 827, a favorites icon 828 and a tickets icon 829. The icons may be displayed by the aggregation application such that when they are selected, the aggregation application responds with various functionality. For example, selection of the aggregation application icon 826 may cause the aggregation application to display the aggregation application home screen. In another example, selection of the search icon 827 may cause the aggregation application to display a search page. In another example, selection of the favorites icon 828 may cause the aggregation application to display the user's favorites or to make a content a favorite. In another example, selection of the ticket icon 829 may cause the aggregation application to display a ticket purchase or other content purchase page.

Home Screen/Favorite Articles:

In embodiments, other interface elements of various shapes and colors, such as a gold bar with a star may be displayed by the aggregation application on the home screens. For example, the gold bar with a star on the left may represent the user's favorite articles that they have read within the aggregation application that they want the aggregation application to keep stored in a separate area. In order for a user to instruct the aggregation application to input articles into this "favorite articles" tab, the aggregation application may respond to use input such as a user's touch or click on the star button user interface element displayed at the bottom left of the article page next to the social media and sharing icons, for example. As the aggregation application, responsive to user input, begins to add different articles into the favorites section, the aggregation application may display the items individually in response to a user touching or clicking on the "Favorite Articles" tab on the home screen of the aggregation application. For example, this may bring up the favorites page. From the favorites page, the aggregation application may display interface elements to provide the user with the ability to click on any individual story they have favorite. In some embodiments, the aggregation application may display user interface elements such that the user has the control to delete stories they do not wish to keep in the favorite articles section.

Home Screen/Add a New Artist:

In embodiments, in order for the aggregation application to provide/display notifications and updates to the user (e.g., update on their favorite musicians, bands, and festivals), the aggregation application must receive an indication (e.g., via the user interface) that an artists is selected as a favorite. For example, in order to do this, the aggregation application may display a tab (e.g., located just below the Favorite Articles tab titled "Add a new artist") that a user may select. In embodiments, this tab also creates the same search page as another interface element (e.g., the magnifying glass icon on the top left of the home screen). Therefore the aggregation application provides the user with two different ways of getting into a search page. For example, when the "Add a new Artist" tab or the magnifying glass icon on the top left are selected by the user, the aggregation application directs the screen interface elements to slide (e.g., slide over from left to right) and bring up the search bar populated with artists, bands, and festivals from the aggregation application database. In some embodiments, the screen may be configured to leave a portion of the Home Screen page (e.g., on the right hand side) in order to display an interface element for the user to be able to swipe from right to left to return to the Home Screen.

In embodiments, the aggregation application may also display another interface element (e.g., the Magnifying Glass Search Icon 827) that may be selected by the user in order direct (e.g., to navigate back to the Home Screen) the aggregation application to display the home screen. In embodiments, the top of a screen may contain interface elements (e.g., search bar with a magnifying glass icon) that can be clicked on. When the interface elements (e.g., the magnifying glass icon) is selected or clicked on, the aggregation application may direct a portion of the home screen (e.g., on the right) to disappear. In embodiments, the aggregation application may direct display of a mobile phone keyboard to appear on screen (e.g., on the bottom half of the screen). For example, this interface may allow the user to begin typing in an artists' name in order to find the artist within the aggregation application database. In some embodiments, as the user begins typing, the aggregation application will cause the suggested search queries to populate according to the text the user has typed in. If the artist name is not found, the aggregation application may provide the user with an opportunity to add the user to our database by clicking the "+" on the right side of their name.

In embodiments, once the user has indicated the artist to the aggregation application (e.g., by typing the artist into the search bar), the aggregation application will direct the artist name to appear (e.g., with an unselected heart icon) which allows the user to select that artist as one of their favorites. If the user decides to select the artist as one of their favorites to receive news updates and information about, they will click on the unselected heart icon (an interface element displayed by the aggregation application) on the right hand side, which causes the aggregation application to turn the heart green and lets the user know that they have officially selected the artist. Other arrangements of interface elements and functionality may be provided by the aggregation application to provide search for and selection of favorite artists within the aggregation application, in embodiments.

In embodiments, once the user selects the artist as a favorite by clicking the heart icon and causing the aggregation application to display such an indication (e.g., fill it in green), the aggregation application may automatically add that artist/band/festival name to the home screen (e.g., when the home screen is displayed).

Within the search bar page, the aggregation application will also display the artist, bands, and festival names (e.g., listed in alphabetical order from A to Z) in embodiments. The aggregation application may display interface elements such that a user can scroll their finger up and down to view the entire list and can select the letter on the right side of the search bar to skip directly to a specific letter in order to simplify the user's search functionality.

In embodiments, the aggregation application may be configured allows users to follow industry specific news based upon the users interest. For example, if the user is a Country Music Fan, they can interact with interface elements to select "Country Music News" as a favorite to get all news updates within that particular industry. This can be done for each individual genre as well, in embodiments.

Home Screen/Privacy Policy & Terms of Use/Sign Out:

In embodiments, the aggregation application may display interface elements such that (e.g., on the bottom of the Home Screen) the user has the ability to Sign Out of the application, as well as the ability to read through Terms of Use and Privacy Policy. These may be displayed as links attached to the aggregation application website and may be viewed at any point by the user, for example.

Home Screen/Favorite Artists:

As mentioned previously in the above section, when searching via the aggregation application, the user may be provided with interface elements that provide the ability to favorite content (e.g., an artist, band, or festival) by selecting interface elements (e.g., clicking the heart icon) and the aggregation application may responsively change an interface element's appearance (e.g., having it appear green on the screen). In embodiments, this may cause the aggregation application to add the artist to the home screen (e.g., by creating a black bar with that artists name on it). This allows the user to easily access their favorite bands news and updates right when they login to the aggregation application, for example.

In embodiments, once the aggregation application displays the content (e.g., an artist name) on the home page, the aggregation application will provide interface elements such that the user will have control on how to organize content (e.g., organize their favorite artists lists by clicking on the icon to the left of each artist name that represents three green parallel lines). For example, in order to move the artist name up or down, the user clicks on the green parallel lines icon and drags their finger in the direction they want the artist to go. When they have found the spot, the user can simply release their finger and drop the artist name into the new spot. This allows the aggregation application to receive instructions via the user interface such that the user can organize their favorite artists in any particular order they would like.

In some embodiments, when displaying the Favorite Artists on the home screen, the right side of each artist bar may be displayed such that the artist bar contains an alert notification shown as a circle with a "1" inside it next to the artist. This "1" icon in the circle shows that there was a push notification sent to the user that they did not open at the time it was sent to them. This allows the user to be able to reference important stories that they were previously notified about, but were unable to view at that specific point in time.

In embodiments, if the "Favorited Artist" (e.g., an artist indicated by a user as a favorite of the user) does not have a notification icon on the right side of their name, then there will be a time display showing the time of the most recently posted news story pertaining to that particular artist. This may allow the user to see how recently a new story has been delivered within the aggregation application, for example.

Also, in embodiments, based upon the users artist selection via the aggregation application user interface, analytics may be performed by the aggregation application or content delivery service to determine what the individual user's purchasing habits are based upon their musical tastes. By obtaining and tracking each individual's artist list and their activity within the aggregation application, mobile ads may be strategically positioned (e.g., based on the user's content interests).

Home Screen—Favorite Artist Settings

The aggregation application may be configured to more efficiently manage Favorite Artists by providing interface elements allowing a user to select, which Favorited Artists should be displayed on the home screen, and to control the alerts/push notifications by each individual artist.

For example, by clicking an icon displayed by the aggregation application (e.g., on the top right of the Home Screen that represents a "green heart overlaying three parallel lines") the user can instruct the aggregation application to display a list of all of the currently favorite artists in alphabetical order. When the user clicks on this icon, the aggregation application may instruct the screen to slide (e.g., slide over from right to left) and display the favorite artist settings page. In embodiments, this screen displays a portion of the Home Screen on the left hand side in order for the user to easily slide their finger from left to right in order to get back to the Home Page. The user can also hit the "green heart overlaying three parallel lines" icon (now on the top left) in order to instruct the aggregation application to display the Home Screen as well.

In some embodiments, on the right side of each Favorited Artist name, the aggregation application may display a small "Home Icon" that, when selected, allows the user to personally select which Favorite Artists they would like to appear on the Home Screen and which ones they do not. For example, if the "Home Icon" is green, that may indicate that it is currently displayed on the Home Screen, and if it is white, it will not be displayed on the Home Screen, but the user can still have access to view them from this page.

In embodiments, there is also a search bar with the magnifying glass icon on the top middle of the favorite artist settings page that allows the user to type and search for a particular artist just within their favorites. For example, when the user clicks on the search bar icon, the aggregation application displays the mobile keyboard and allows the user to start typing. The search is also populated and filtered as the user begins typing in the name.

In embodiments, interface elements may be displayed (e.g., next to the search bar icon, there may be a small "Gear Icon" on the top of the right side that represents the user's ability to manage the settings on each particular favorite artist). For example, when the "Gear Icon" is selected, the icon may immediately turn into a green "Cancel" button to get out of the settings feature and go back to the favorite articles page. Once the user clicks the "Gear Icon" the "Home Icons" may change into 2 different icons; a "Green Filled Heart Icon" and a "Notification On/Off Switch." For example, when the user clicks on the "Green Filled Heart Icon" it may remove that favorite artist from their Favorite Artist List. When the user clicks on the "Notification On/Off Switch" it allows the user to turn off push notifications for that particular artist, for example.

In some embodiments, when the user has configured the aggregation application for push notifications for one of their favorite artists, the aggregation application will display or otherwise indicate a notification from the aggregation application alerting the user of breaking news stories and updates about each particular artist they have favorited. In embodiments, the user will not receive notifications for artists that they have not selected as one of their "Favorites." When notifications are turned on, the user will receive updates that appear on their phone screen as a notification from the aggregation application.

Artist Page:

In embodiments, the aggregation application may be configured such that when the user clicks on an artist name from anywhere in the app (search bar, home page, favorite artists page, or suggested artist) it takes the user directly to that artists specific page within the aggregation application. This page can be referenced as the artist page, for example.

For example, each artist may have an individual page that displays to the user more about that artist and provides a selectable interface element to potentially "favorite/heart" the artist and start receiving updates on that particular artist. In embodiments, each content, such as an artist screen has a picture of the artist at the top. For example, if the user clicks on the picture, it brings up multiple icons for the user to select. In embodiments, these icons include Band Information, Tour/Concerts Dates, Streaming Capabilities on various streaming platforms, Song Purchases on iTunes, Merchandise Purchases, Lyrics, Music Tabs, etc. The aggregation application thus provides an interface that allows users to access virtually any aspect of music they want to reach from the aggregation application and allows aggregation application to be the hub for all things music. In embodiments, such functionality attracts people to use the aggregation application on a regular basis (e.g., because of breaking news stories and updates that are all available in a single application). Such a single source of information as the aggregation application serves to functions to create new monetization streams and kickback from various other services and system that the aggregation application and content delivery system link services with.

In embodiments, the aggregation application may display, underneath the artist's picture, a black rectangular bar that will list the Band/Artist/Festival name that the user has selected. Further display may include (e.g., on the right side of the name) the same heart icon that is used to "favorite" the artist. For example, if the artist has been "favorited" by the user, the heart will appear green. If the artist has not been "favorited" by the user, the heart will appear white. The user will also have the ability within this page to click on the "Heart Icon" and "favorite/un-favorite" that particular artist, for example.

Another example of a user interface element that may be displayed by the aggregation application includes (e.g., below the black artist bar mentioned above) news stories and videos based upon the particular artist that is currently being displayed by the aggregation application. For example, these articles are displayed by the green horizontal rectangular bars on the page. If there are no current news stories or videos for that particular artist, it will simply display "No news articles to display" to let the user know that this particular artist does not have any news stories in the content delivery system database. In embodiments, the news stories display the story title, source of news, and the time displayed in the aggregation application. The story title may be displayed in the larger white font and all of the sources are listed directly underneath the article title in smaller white font with the word "via" referencing who published the article. The time display of the article may be shown on the right hand side of the green rectangular tab. Also, please note that, in some embodiments, these news articles have a scroll feature added into them for the user to view more stories. As the user scrolls their finger over the news articles from bottom to top of the screen, the news stories and the artist name bar move upwards over the picture until the picture is gone. The aggregation application may be configured such that a black name bar will move to the top of the screen and will stay there as the other news stories continue to disappear off of the top of the screen. This allows the user to always be able to see the name of the artist's page they are viewing, in embodiments. The scroll capabilities function in accordance with mobile app finger swiping technology, for example, and allow the user to easily scroll up and down between the various news articles, in embodiments.

The aggregation application may act as a portal for various types of content. For example, if the news feed contains a YouTube video for that artist, the YouTube video will be displayed differently than the news articles, and will allow the user to click the video from the news feed and have the video immediately begin to play within the aggregation application, in embodiments.

In some embodiments, from the artist page, the aggregation application may display interface elements that allow the user can click on the "<" icon on the top left of the screen in order to return to the home page. They can also click on the "Green Heart with Parallel Lines" icon on the top right to access their favorite artist settings page as previously mentioned, in embodiments.

News Articles Page:

FIG. 8C illustrates an example, news article page, in embodiments. In embodiments, once the user selects a specific news article (e.g., either from a particular artist page, or from the ten recommended articles on the home screen) the aggregation application may display a web browser view within the aggregation application that displays the article directly as if the user were viewing in a mobile web browser without having to leave the application.

While the user is viewing the article in a mobile web browser format, they can return to the previous screen by hitting the "<" icon on the top left of the screen, in embodiments. In other embodiments, the aggregation application also displays interface elements such that the user may have access to their favorite artists lists by hitting the "Green Heart With Parallel Lines" icon on the top right of the application screen.

At the bottom of the news article screen, underneath the web browser, there may be four icons that allow the user to favorite and share this particular article to friends and family in various ways, in embodiments.

In one example, the "Star Icon" on the bottom is displayed by the aggregation application to allow the user to add the article they are currently viewing to their favorite articles list, which can be found on their home screen. Similarly, the standard "f" button that may be displayed by the aggregation application, such that upon selection, the content or story is shared on Facebook. To the right of the Facebook icon, is the standard "Bird Icon" or the text "tweet" that may be displayed by the aggregation application so as to allow the user, upon selection to easily instruct the aggregation application to post the article on their twitter page. In some embodiments, a "Box with an upward arrow" icon that is a standard iOS button that may be displayed by the aggregation application so as to allow the user to select the interface element to share the news article to their friends and family via text message or email. All or some of these features may allow articles in the aggregation application to be sent/shared by our users and displayed on their friends and families devices so they know that they were reading the article within the aggregation application.

FIGS. 9A-9D illustrate user interface elements for a platform management module 120, according to embodiments. FIGS. 9A-9D illustrate interface elements the may be instructed for display by a management platform module 120 and configured to receive information associated with management of content associated with an artist, in embodiments. FIG. 9A illustrates interface elements that may be displayed so as to prompt an artist or an artist's agent to enter content information associated with an article. For example add article template 910 may prompt entry of a title 912, a source 914, article link 916, picture link 918, date 919 and a "push to fans" selection interface element along with clear and confirm buttons, as illustrated.

FIG. 9B illustrates interface elements that may be displayed so as to prompt an artist or an artist's agent to enter content information associated with social media content. Social media connections template 920 may include interface elements for entry of a facebook link 922, twitter link 924, you tube link 926 and soundcloud link 928 as well as clear and confirm buttons, in embodiments.

FIG. 9C illustrates interface elements that may be displayed so as to prompt an artist or an artist's agent to enter content information associated with video content. Add you tube video template 930 may include interface elements for entry of a title 932, you tube link 934, date 936 and clear and confirm buttons, in embodiments.

FIG. 9D illustrates interface elements that may be displayed so as to prompt an artist or an artist's agent to enter content information associated with an artist's image. Add artist image template 940 may include interface elements for entry of an imgur link 942 and clear and confirm buttons, in embodiments.

In embodiments, the content information obtained via the various interface elements in FIGS. 9A-9D may become part of the aggregated content considered for selection by the content delivery application. In some embodiments, the content information obtained may be used as part of the interface elements of the aggregation application associated with the particular artist.

Figure 10:
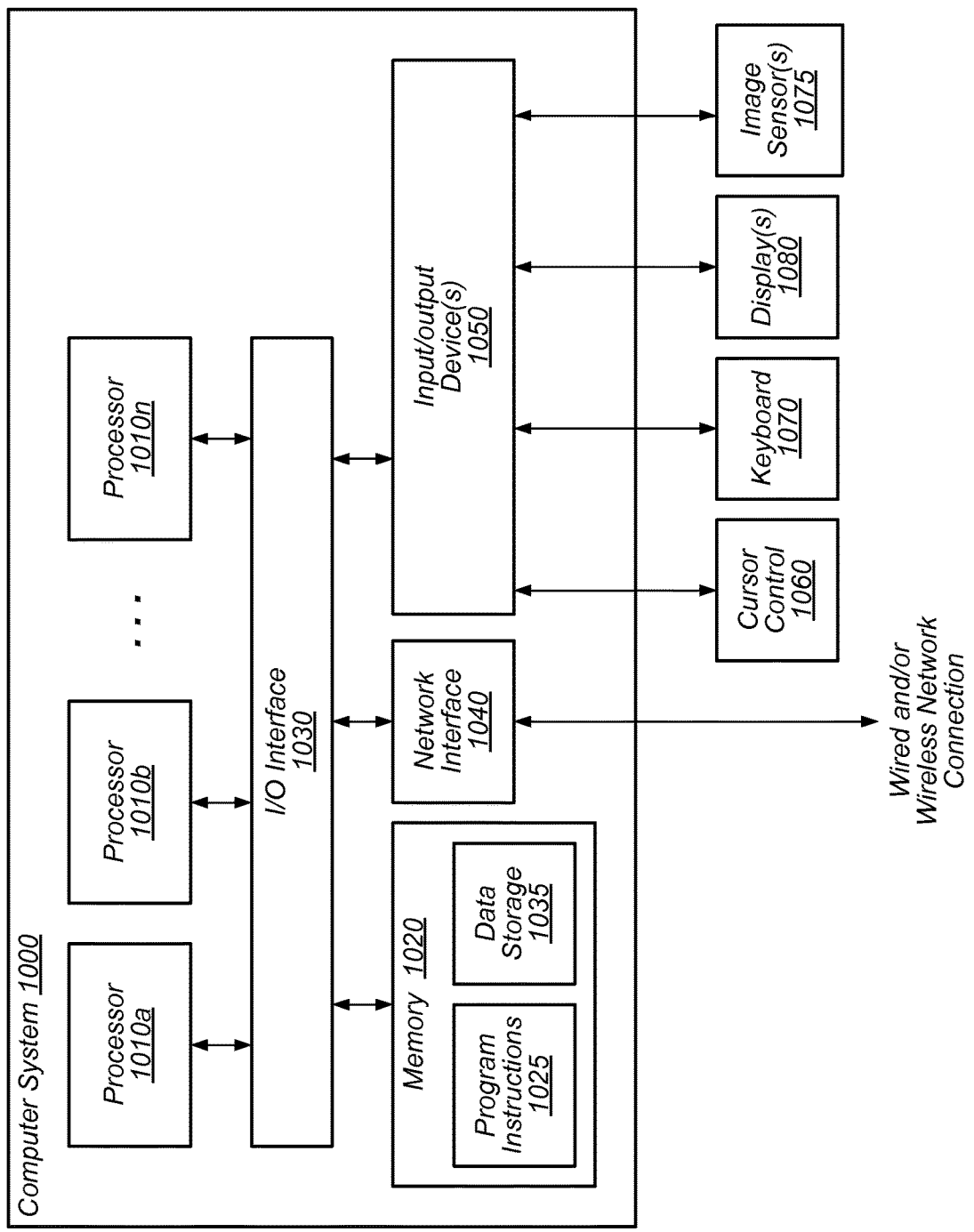
FIG. 10 is a block diagram illustrating an example computer system that implements some or all of the techniques described herein, according to different embodiments.

FIG. 10 illustrates computer system 1000 that is configured to execute any or all of the embodiments described above. In different embodiments, computer system 1000 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for aggregating and delivering content, as described herein, may be executed on one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, and image sensor(s) 1075. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g. two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1025 and/or data 1035 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1025 may be configured to implement a content aggregation and/or delivery application/service incorporating any of the functionality described above. Additionally, data 1035 of memory 1020 may include system and/or content information including any of the information or data structures described above, including but not limited to content, or various parameter values used in implementing the techniques and components described herein. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g. system memory 1020) into a format suitable for use by another component (e.g. processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g. carrier or agent devices) or between nodes of computer system 1000. The network (e.g., network 130) may in various embodiments include one or more networks including but not limited to Local Area Networks (LANs) (e.g. an Ethernet or corporate network), Wide Area Networks (WANs) (e.g. the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, which may be processor-executable to implement any element or action described above. In one embodiment, the program instructions may implement the methods described above, such as the methods illustrated by FIGS. 2, 4, 6 and 9. In other embodiments, different elements and data may be included. Note that data 1035 may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g. as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g. disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system comprising:
    a content delivery system comprising:
        a platform management module comprising one or more artist templates, wherein the one or more artist templates comprise a plurality of interface elements configured to prompt an artist or an agent of the artist to enter content information and to receive the content information entered by the artist or the agent of the artist;
        a content aggregation module configured to receive a plurality of content and filter, using the content information entered by the artist or the agent of the artist, the plurality of content to obtain a subset of the plurality of content;

a representation generation module configured to generate representations for the subset of the plurality of content, wherein generation of the representations comprises hashing the content into respective representations, wherein the respective representations comprise respective hash values;

an analytics engine configured to determine that a representation of a first content is similar to a representation of a second content based on a bit error rate between the representation of the first content and the representation of the second content, wherein the content delivery system is configured to:

receive calendar information stored on the user device, and use the calendar information to filter the plurality of content to obtain the subset of the plurality of content, to determine another subsequent content to select from the subset of the plurality of content, or both, wherein the calendar information pertains to a date of a concert, an identity of an artist performing the concert, or some combination thereof, transmit a first content notification message to a user device, wherein the first content notification message corresponds to the first content, receive, from the user device, an indication that the first content notification message is selected, deliver the first content to the user device in response to the indication, receive tracking information pertaining to an interaction with the first content on the user device, wherein the interaction comprises an amount of time the first content is consumed on the user device, implement a feedback loop based on the tracking information to determine a subsequent content to select from the subset of the plurality of content, determine a content recommendation for the user device based on a similarity between the respective hash values of the representation of the first content and the representation of the second content, determine that the similarity between the respective hash values of the representation of the first content and the representation of the second content is below a predetermined bit error rate threshold, in response to the determining that the similarity between the representation of the first content and the representation of the second content is below the predetermined bit error rate threshold, transmit a content recommendation notification message to the user device, wherein the content recommendation notification message corresponds to the content recommendation, receive, from the user device, an indication that the content recommendation notification message is selected, and transmit the second content to the user device in response to the indication; and a content delivery application executing on the user device, wherein the content delivery application is configured to operate with the content delivery system, and the content delivery application comprises a local application interface that interacts with a plurality of application programming interfaces to incorporate a plurality of external applications and websites associated with the plurality of application programming interfaces into the content deliver application, wherein the incorporated plurality of external applications and websites perform one or more of the following operations:

provide a streaming music subscription, and provide an aggregation application interface for a festival via a downloadable application or website via the local application interface of the content deliver application, wherein the aggregation application interface provides an offer to purchase concert tickets for the festival.

2. The system of claim 1, wherein the analytics engine is further configured to determine a purchase point for the user device based at least in part on profile data of an individual customer associated with the user device.

3. The system of claim 2, wherein:

the content recommendation for the user device comprises content to recommend for purchase; and the analytics engine is further configured to:

generate a strategy to move the individual customer toward the purchase point, and instruct delivery of a strategic notification to the user device, the strategic notification based at least in part on the strategy to move the individual customer towards the purchase point, the strategic notification comprising content associated with the content recommended for purchase.

4. The system of claim 1, wherein the content comprises audio files generated by respective artists, and wherein the content delivery system is further configured to:

receive, via the platform management module, an indication of curated content, wherein access to the platform management module is restricted to the artist or the agent of the artist; and wherein the content recommendation comprises a recommendation for the curated content.

5. A computer-implemented method comprising:

receiving, from a platform management module of a content delivery system, content information entered by an artist or an agent of the artist, wherein the content information is entered via a plurality of interface elements included in one or more artist templates;

receiving, by a content delivery system, a plurality of content;

receiving calendar information stored on a user device, wherein the calendar information pertains to a date of a concert, an identity of an artist performing the concert, or some combination thereof, filtering, using the calendar information and the content information entered by the artist or the agent of the artist, the plurality of content to obtain a subset of the plurality of content;

selecting, by an analytics engine, a first content of the subset of the plurality of content;

in response to the selection of the first content, generating, by a notification module of the content delivery system, a content notification message corresponding to the first content;

transmitting, by the content delivery system, the content notification message to the user device to cause the content notification message to be presented on the user device;

receiving, from the user device, an indication that the content notification message is selected;

delivering the first content of the subset of the plurality of content to the user device in response to the indication;

receiving tracking information pertaining to an interaction with the first content on the user device, wherein the interaction comprises an amount of time the first content is consumed on the user device;
implementing a feedback loop based on the tracking information to determine a subsequent content to select from the subset of the plurality of content;
generating, by a generation module of an analytics engine, respective representations of the subset of the plurality of content, wherein the generating of the respective representations of the subset of the plurality of content comprises hashing each of the subset of the plurality of content into respective representations, wherein the respective representations comprise respective hash values;
determining, by the analytics engine, a content recommendation for a user device based on a similarity between the respective hash values of a representation of the first content and a representation of the second content;
determining that the similarity between the respective hash values of the representation of the first content and the representation of the second content is below a predetermined bit error rate threshold;
in response to the determining that the similarity between the respective hash values of the representation of the first content and the representation of the second content is below a predetermined bit error rate threshold, transmitting, by the notification module of the content delivery system, a content recommendation notification message to the user device, wherein the content recommendation notification message corresponds to the content recommendation;
directing, by the content delivery system, a delivery of the second content, the subsequent content, or both to the user device; and
causing a content delivery application to be executed on the user device, wherein the content delivery application is configured to operate with the content delivery system, and the content delivery application comprises a local application interface that interacts with a plurality of application programming interfaces to incorporate a plurality of external applications and websites associated with the plurality of application programming interfaces into the content deliver application, wherein the incorporated plurality of external applications and websites perform one or more of the following operations:
provide a streaming music subscription, and
provide an aggregation application interface for a festival via a downloadable application or website via the local application interface of the content deliver application, wherein the aggregation application interface provides an offer to purchase concert tickets for the festival.

6. The computer-implemented method of claim 5, wherein the content recommendation for the user device is based on profile data of an individual customer associated with the user device.

7. The computer-implemented method of claim 6, further comprising determining a purchase point for the individual customer based on the profile data.

8. The computer-implemented method as recited in claim 7, wherein:
the content recommendation for the user device comprises content to recommend for purchase; and
the method further comprises:
generating a strategy to move the individual customer toward the purchase point, and
instructing delivery of a strategy notification to the user device, the strategy notification based on the strategy to move the individual customer towards the purchase point, the strategy notification comprising content associated with the content recommended for purchase.

9. The computer-implemented method of claim 8, further comprising:
determining that the similarity between the respective hash values of the representation of the first content and the representation of the second content is not below the predetermined bit error rate threshold;
receiving, from the user device, an indication that the strategy notification has been selected in response to the similarity not being below the predetermined bit error rate threshold; and
instructing delivery of the content recommended for purchase.

10. The computer-implemented method of claim 9, further comprising:
receiving tracking information indicative of a response to the content recommended for purchase; and
updating analytics data associated with the individual customer based on the tracking information.

11. The computer-implemented method of claim 5, wherein the content recommendation comprises an audio file.

12. The computer-implemented method of claim 5, wherein the content recommendation comprises an offer for merchandise or tickets.

13. The computer-implemented method of claim 5, wherein:
the content comprises audio files generated by respective artists; and
the method further comprises:
receiving, from the platform management module, an indication of curated content, wherein access to the platform management module is restricted to the artist or the agent of the artist, and wherein the content recommendation comprises a recommendation for the curated content.

14. A non-transitory, computer readable storage medium storing program instructions that, when executed by one or more processors of a computing device, perform operations comprising:
receiving, from a platform management module of a content delivery system, content information entered by an artist or an agent of the artist, wherein the content information is entered via a plurality of interface elements included in one or more artist templates;
receiving calendar information stored on a user device, wherein the calendar information pertains to a date of a concert, an identity of an artist performing the concert, or some combination thereof,
filtering, using the calendar information and the content information entered by the artist or the agent of the artist, the plurality of content to obtain a subset of the plurality of content;
selecting a first content of the subset of the plurality of content;
in response to the selection of the first content, generating a content notification message corresponding to the first content;
transmitting the content notification message to a user device, the content notification message corresponding to a first content of the plurality of content;
receiving an indication that the content notification message has been selected from the user device;

instructing delivery of the first content of the subset of the plurality of content;

receiving tracking information pertaining to an interaction with the first content on the user device, wherein the interaction comprises an amount of time the first content is consumed on the user device;

implementing a feedback loop based on the tracking information to determine a subsequent content to select from the subset of the plurality of content;

generating respective representations of the subset of the plurality of content, wherein the generating of the respective representations of the subset of the plurality of content comprises hashing each of the subset of the plurality of content into respective representations, wherein the respective representations comprise respective hash values;

determining a content recommendation for the user device based on a similarity between the respective hash values of a representation of the first content of the subset of the plurality of content and a representation of the second content of the subset of the plurality of content being below a predetermined bit error rate threshold; and transmitting a content recommendation notification message corresponding to the content recommendation to the user device for display; and causing a content delivery application to be executed on the user device, wherein the content delivery application is configured to operate with the content delivery system, and the content delivery application comprises a local application interface that interacts with a plurality of application programming interfaces to incorporate a plurality of external applications and websites associated with the plurality of application programming interfaces into the content deliver application, wherein the incorporated plurality of external applications and websites perform one or more of the following operations:

provide a streaming music subscription, and provide an aggregation application interface for a festival via a downloadable application or website via the local application interface of the content deliver application, wherein the aggregation application interface provides an offer to purchase concert tickets for the festival.

15. The non-transitory, computer readable storage medium of claim 14, wherein the content recommendation for the user device comprises content to recommend for purchase for an individual customer associated with the user device, and wherein the operations further comprise:

generating a strategy to move the individual customer toward a purchase point; and instructing delivery of a strategy notification to the user device, the strategy notification based on the strategy to move the individual customer toward the purchase point, the strategy notification comprising content associated with the content recommended for purchase.

16. The non-transitory, computer readable storage medium of claim 15, wherein the operations further comprise:

receiving tracking information indicative of a response to the content recommended for purchase; and update analytics data associated with the individual customer based on the tracking information.

17. The non-transitory, computer readable storage medium of claim 16, wherein the content comprises audio files generated by respective artists, and wherein the operations further comprise:

receiving, from the platform management module, an indication of curated content, wherein access to the platform management module is restricted to the artist or the agent of the artist; and wherein the content recommendation comprises a recommendation for the curated content.

18. The system of claim 1, wherein the content delivery system receives second tracking information pertaining to user behavior based on the first content notification message being selected, the content recommendation notification message being selected, or both, and the content delivery system uses the second tracking information to filter the plurality of content to obtain the subset of the plurality of content, to determine another subsequent content to select from the subset of the plurality of content, or both.

* * * * *